(12) United States Patent
Charboneau

(10) Patent No.: US 8,533,182 B1
(45) Date of Patent: Sep. 10, 2013

(54) APPARATUSES, SYSTEMS, AND METHODS FOR EFFICIENT GRAPH PATTERN MATCHING AND QUERYING

(76) Inventor: David P. Charboneau, Durham, NC (US)

(*) Notice: Subject to any disclaimer, the term of this patent is extended or adjusted under 35 U.S.C. 154(b) by 0 days.

(21) Appl. No.: 13/485,904

(22) Filed: May 31, 2012

(51) Int. Cl.
*G06F 7/00* (2006.01)
*G06F 17/30* (2006.01)

(52) U.S. Cl.
USPC .......................................................... 707/718

(58) Field of Classification Search
USPC .......... 705/7.14; 707/694, 765, 781; 714/6.3
See application file for complete search history.

(56) References Cited

U.S. PATENT DOCUMENTS

| | | | |
|---|---|---|---|
| 7,433,885 B2* | 10/2008 | Jones | 1/1 |
| 7,614,037 B2* | 11/2009 | Gavrilov | 717/105 |
| 7,937,345 B2* | 5/2011 | Schmidtler et al. | 706/20 |
| 8,024,336 B2* | 9/2011 | Wai | 707/731 |
| 8,046,354 B2* | 10/2011 | Day et al. | 707/720 |
| 2004/0054636 A1* | 3/2004 | Tango-Lowy | 706/16 |
| 2004/0103108 A1* | 5/2004 | Andreev et al. | 707/100 |
| 2004/0152957 A1* | 8/2004 | Stivoric et al. | 600/300 |
| 2005/0131924 A1* | 6/2005 | Jones | 707/100 |
| 2006/0085370 A1* | 4/2006 | Groat et al. | 707/1 |
| 2006/0218123 A1* | 9/2006 | Chowdhuri et al. | 707/2 |
| 2006/0253418 A1* | 11/2006 | Charnock et al. | 707/1 |
| 2007/0009155 A1* | 1/2007 | Potts et al. | 382/182 |
| 2008/0148163 A1* | 6/2008 | Charboneau et al. | 715/762 |
| 2008/0249966 A1* | 10/2008 | Luege Mateos | 706/11 |
| 2009/0164431 A1* | 6/2009 | Zivkovic et al. | 707/3 |
| 2010/0145986 A1* | 6/2010 | Lim et al. | 707/769 |
| 2010/0223276 A1* | 9/2010 | Al-Shameri et al. | 707/769 |
| 2011/0004863 A1* | 1/2011 | Feblowitz et al. | 717/105 |
| 2011/0071969 A1* | 3/2011 | Doctor et al. | 706/15 |
| 2011/0119245 A1* | 5/2011 | Sargeant et al. | 707/706 |
| 2011/0261049 A1* | 10/2011 | Cardno et al. | 345/419 |
| 2012/0084238 A1* | 4/2012 | Kristal et al. | 706/12 |
| 2012/0254184 A1* | 10/2012 | Choudhary et al. | 707/738 |
| 2012/0310916 A1* | 12/2012 | Abadi et al. | 707/713 |

OTHER PUBLICATIONS

Chen, Chun-Hsien et al., A Neural Network Architecture for High-Speed Database Query Processing, Dept. of Computer Science, Iowa State University, Ames, Iowa.
Malewicz, Grzegorz et al., Pregel: A System for Large-Scale Graph Processing, Sigmod'10, Indianapolis, Indiana, Jun. 6-11, 2010.

(Continued)

*Primary Examiner* — Robert Beausoliel, Jr.
*Assistant Examiner* — Nicholas Allen
(74) *Attorney, Agent, or Firm* — Oliver Law Group, PLLC

(57) ABSTRACT

Apparatuses, systems, and methods for efficient graph pattern matching and querying are disclosed. According to an aspect, a method includes providing a graph comprising vertices and edges associated with the vertices. Further, the method includes sending one or more first activation messages to a first set of the vertices, wherein each of the first activation messages has a value. The method also includes determining, at each vertex of the first set of vertices, whether the values of the one or more first activation messages received at the vertex meets a query condition. Further, the method also includes sending, at each vertex of the first set of vertices, one or more second activation messages from the vertex to a second set of vertices in response to determining that the values of the one or more first activation messages received at the vertex meets the query condition.

30 Claims, 15 Drawing Sheets

(56) References Cited

OTHER PUBLICATIONS

Radul, Alexey Andreyevich et al., Propagation Networks: A Flexible and Expressive Substrate for Computation, Dissertation submitted to the Dept. of Electrical Engineering and Computer Science, Sep. 2009.

Bader, David A. et al., STINGER: Spatio-Temporal Interaction Networks and Graphs (STING) Extensible Representation, May 8, 2009.

Low, Yucheng et al., GraphLab: A New Framework for Parallel Machine Learning, Presentation, Carnegie Mellon.

* cited by examiner

APPARATUSES, SYSTEMS, AND METHODS FOR EFFICIENT GRAPH PATTERN MATCHING AND QUERYING

TECHNICAL FIELD

The present disclosure relates to computer databases. More particularly, the present disclosure relates to graph pattern matching and querying.

BACKGROUND

Graphs may be used to model many different kinds of data. In a graph database, a graph has one or more vertices connected by one or more edges. Each vertex has a value and an identifier. A graph database may represent a directed or undirected graph. In a directed graph database, each edge specifies a source vertex and a target vertex. In an undirected graph database, each edge specifies a pair of vertices with no order or name implied. An undirected graph may be modeled in a directed graph database by specifying a pair of edges with the source and target vertices reversed. Edges in a graph database may or may not be labeled to specify the kind of relation indicated by the edge between vertices.

Query over a graph database is accomplished via sub-graph pattern matching and subsequently projecting desired values out from the matched pattern for the result. A subgraph is a collection of vertices and edges that are a subset of the vertices and edges contained in the graph represented in a graph database. A sub-graph pattern is an abstract representation of a sub-graph where some vertices and/or edges have been specified as variables that should be satisfied by sub-graphs that match the sub-graph pattern. A projection of values from a sub-graph that matches a sub-graph pattern is a selection of the vertices that satisfy the variables in the sub-graph pattern.

To reduce the time required to perform a query over a graph, indexing of the edges between vertices can be used and combined with indexing of the values represented by the vertices. Current approaches use such indices to find and aggregate simple pattern matches that can be combined to generate complex query pattern results; however, this approach can be difficult to scale and must be performed largely in serial. Accordingly, for at least these reasons, it is desired to provide improved techniques for graph pattern matching and querying.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are apparatuses, systems, and methods for efficient graph pattern matching and querying. According to an aspect, a method includes providing a graph comprising vertices and edges associated with the vertices. Further, the method includes sending one or more first activation messages to a first set of the vertices, wherein each of the first activation messages has a value. The method also includes determining, at each vertex of the first set of vertices, whether the values of the one or more first activation messages received at the vertex meets a query condition. Further, the method also includes sending, at each vertex of the first set of vertices, one or more second activation messages from the vertex to a second set of vertices in response to determining that the values of the one or more first activation messages received at the vertex meets the query condition.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
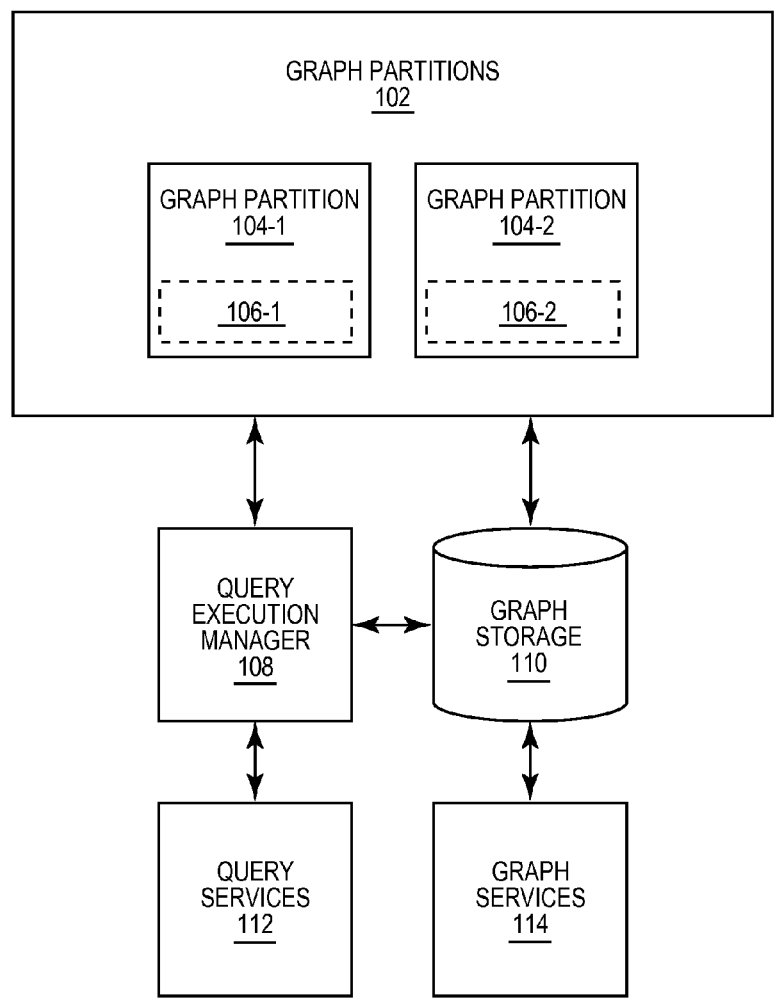
FIG. 1 is a schematic block diagram of a system for efficient graph pattern matching and query in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Disclosed are apparatuses, systems, and methods for efficient graph pattern matching and querying. In accordance with embodiments disclosed herein, graph query, or collection of sub-graph patterns, may be executed in parallel directly upon a graph itself as a kind of artificial neural network.

Graphs are composed of vertices and edges. Edges of a graph connect a pair of vertices. A graph with directed edges, or a digraph, is a graph where edges have specific source and target vertices. A graph with undirected edges may be reified to a digraph by mapping undirected edges to a complementary pair of edges with source and target vertices reversed. For example, a graph with vertices A and B, and an edge between vertices A and B, can be reified to a graph with two edges E1 and E2 where edge E1 has vertex A as its source vertex and vertex B as its target vertex, while edge E2 has vertex B as its source vertex and vertex A as its target vertex. It is noted that graph pattern matching and queries in accordance with embodiments of the present disclosure may be performed over digraphs and undirected graphs reified to digraphs.

An artificial neural network is a digraph composed of neurons and synapses. Artificial neural networks can model the electrical properties of neurons and synapses in biological neural networks. Neurons in artificial neural networks can fire electrical impulses that are received by other neurons in the graph through the synapses that connect the neurons. Neurons in an artificial neural network that receive electrical impulses from other neurons can fire if the sum of the electrical inputs is sufficient; that is, the sum of the inputs satisfies some threshold.

While traditional artificial neural networks can model the electrical properties of biological neural networks the present invention may not. Rather, an artificial neural network in accordance with the present disclosure may treat the edges as a kind of synapse that can transport summable messages that are generated by the firing of vertices as neurons. A vertex, or neuron, in an artificial neural network given in accordance with the present disclosure may receive the sum of the messages sent by other vertices along their edges, or synapses, in the graph along with a collection of thresholds to apply in determining whether the vertex should fire one or more messages to its connected vertices and what the content of any fired messages may be.

A vertex may be part of a group of vertices that receives one or more threshold condition messages, or activation messages. Each activation message may have a value. A vertex in receipt of an activation message may be activated. In response to activation of a vertex, the sum of the activation messages received at the vertex may be compared with a threshold condition, or query condition. At each vertex receiving an activation message, it is determined whether the values of the activation messages received at the vertex meets the query condition. In response to determining that the query condition is met, the vertex may fire one or more activation messages to the vertices it is connected to for each of the thresholds it satisfies. Activation messages sent on a vertex firing may specify the vertex that fired and the threshold condition that was satisfied.

Sub-graph patterns to match in a graph query are expressed as vertex firings to stimulate, threshold condition messages to propagate on firing or activation, and threshold conditions to be satisfied by vertices activated by receiving a firing or activation message. A collection of such sub-graph patterns may be executed at the same time, with dependent sub-graph patterns executing in a successive round of threshold tests, firings, and activations.

A record, or trace, of the vertex firings triggered by a graph query or pattern match may be kept or stored to be iterated over for generating a result. Trace paths of a sufficient length may represent pattern matches in a query result. The length required for the trace path may be determined by the sub-graph pattern being matched.

Vertices may not be required to execute in parallel and may instead be executed concurrently. Parallel execution of vertices may be achieved through partitioning the graph into distinct collections of vertices that execute concurrently within their partitions with the partitions executing in parallel on different threads in a single central processing unit (CPU), in separate processes on different CPU cores within a single computer, in separate processes on different CPUs within a single computer, and/or separate processes on different computers on a computer network.

A query execution manager may direct and coordinate execution of a query plan. The query execution manager may control the flow of execution steps. The query execution manager may inform the partitions and vertices of when to execute a step and collects votes on whether to continue, effectively synchronizing the execution of the vertices. It is noted that RDF graphs are used herein as example to illustrate embodiments of the present disclosure; however, the presently disclosed subject matter may also be applied to graph pattern matching and query over any form of graph data.

It is noted that graphs with and without labeled edges may be represented and queried over in accordance with embodiments of the present disclosure.

FIG. 1 illustrates a schematic block diagram of a system 100 for efficient graph pattern matching and query in accordance with embodiments of the present disclosure. Referring to FIG. 1, the system 100 can implement execution of graph pattern matching and queries provided in a suitable query language or representation of a query plan using graph data stored in a database. The system 100 can efficiently and rapidly perform queries by utilizing an array of parallel graph partitions to perform the query. With a partition per vertex, queries that do not involve aggregation can be performed in roughly constant time regardless of joins, with linear time to stream the result set from the resultant query execution trace to a client.

The system 100 includes a collection of graph partitions 102, a query execution manager 108, a graph storage module 110, a query services module 112, and a graph services module 114. The system 100 may be implemented in any suitable computer. As referred to herein, a "computer" may be any programmable machine configured to carry out a sequence of arithmetic or logical operations. A computer may include one or more processors and one or more memory components. Further, a computer may include hardware, software, firmware, or combinations thereof for implementing embodiments of the presently disclosed subject matter. As an example, the query execution manager 108, the query services module 112, and the graph services module 114 may be implemented by hardware, software, and/or firmware.

The collection of graph partitions 102 may include one or more graph partition instances 104. Each graph partition may manage one or more graph vertices 106. For example, graph partition 104-1 may manage graph vertex 106-1 and other vertices. A graph partition 104 may be a process or processor of a computer that is responsible for some subset of the vertices 106 in the graph stored in the graph storage module 110. A graph vertex 106 represents both the data associated to the vertex and the edges associated to and from the vertex as known and stored in the graph storage module 110.

Queries and pattern matches may be performed by sending activation messages and threshold constraints to vertices 106 (i.e., 106-1, 106-2, etc.) through the graph partitions 104 (i.e., 104-1, 104-2, etc.) they are contained in. Each vertex 106 may sum the values of the activation messages that it receives and may compare the sum of its received activation messages and its own value to a threshold constraint for determining whether the threshold is met. In response to the threshold being met, the vertex may generate one or more activation messages for some or all of the edges out from the vertex to one or more other vertices in the graph. The graph partitions 104 may each gather activation messages of the vertices 106 they contain, activate those vertices 106, and gather the messages generated by activated and fired vertices 106 to send out to other graph partitions 104.

The query execution manager 108 may drive execution of queries and pattern matching in graph partitions 104 by sending out the query plan and using bulk synchronous processing to synchronize the graph partitions 104. After a query has executed, the execution manager 108 may drive the generation of query results off of the execution trace generated by the execution of the query.

The graph storage module 110 is a database of vertices and edges. The graph storage module 110 may provide indices for values to vertex identifiers (IDs), storage of directed edges from one vertex to another, and sorted indices over vertex values by vertex id for sorted and range-based queries. The query services module 112 may translate queries specified in some query language into query plans that can be executed by the query execution manager 108. The query services module 112 may support one or more such query languages. Example query languages that may be supported in a query services module 112 include, but are not limited to, SPARQL, RDF data query (RDQL), Datalog, and SQL.

The graph services module 114 may store graph data provided in any suitable format in the graph storage module 110. Example formats that may be supported include, but are not limited to, RDF, comma-separated value (CSV), extensible markup language (XML), and JavaScript object notation (JSON).

Figure 2:
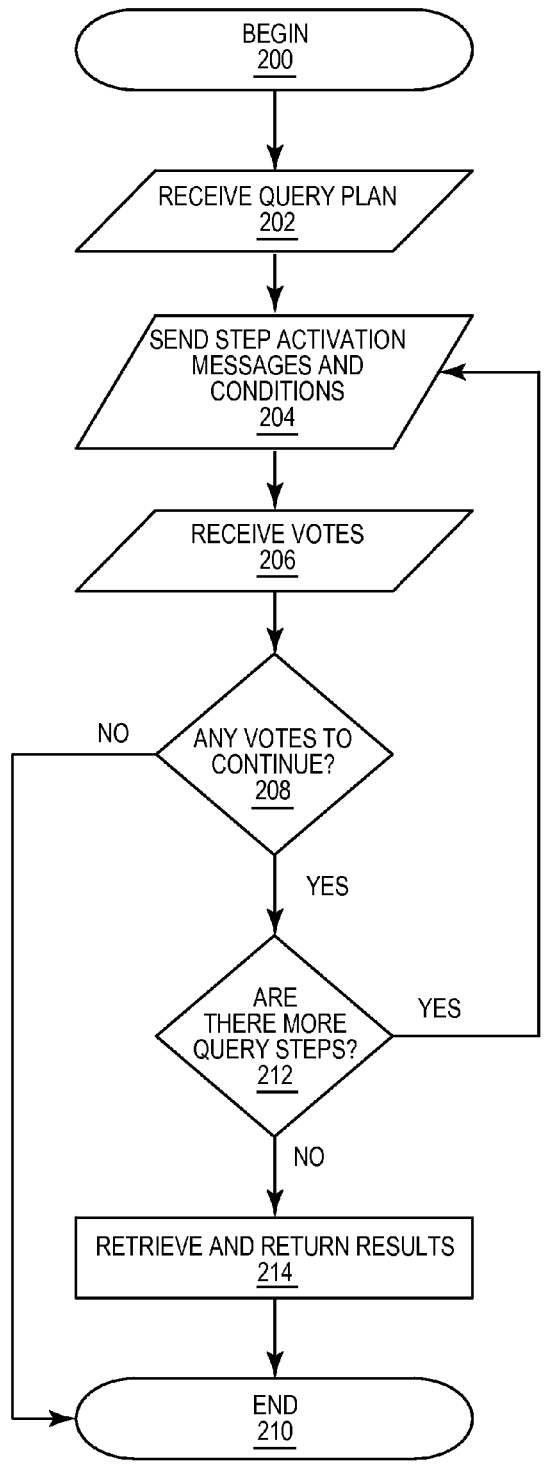
FIG. 2 is a flow chart of an example method for managing execution of a graph query plan in accordance with embodiments of the present disclosure.

FIG. 2 is a flow chart of an example method for managing execution of a graph query plan in accordance with embodiments of the present disclosure. The method of FIG. 2 is described as being implemented by the query execution manager 108 shown in FIG. 1; although the method may otherwise be suitably implemented. Referring to FIG. 2, the method begins at step 200.

At step 202, a query plan may be received. For example, the query execution manager 108 may receive a query plan from the query services module 112. The query plan may include, for example, the specification of an initial query step, one or more successive query steps, and one or more result steps. The initial query step may include one or more initial vertex firings to stimulate and threshold conditions to be propagated on the vertex firings. Successive query steps may include one or more vertex firings to stimulate and threshold conditions to be propagated on the vertex firings as well as threshold conditions to be applied to activated vertices in determining whether or not they should fire. The result steps may include one or more activating conditions to be traversed and whether or not to project the value of the matching vertex.

The method of FIG. 2 may include sending activation messages to graph partitions specifying any vertices to activate and conditions (step 204). For example, the query execution manager 108 may send a query step message to all graph partitions 102. The query step message may specify vertices 106 to activate as well as the threshold conditions that the vertices 106 must satisfy in order to fire. After sending the messages to the vertices 106, the method may wait to receive votes from some or all of the graph partitions 102.

The method of FIG. 2 may include receiving votes from graph partitions (step 206). For example, the query execution manager may receive 206 the votes from the graph partitions 102. In response to receipt of all votes, the method may include determining whether any of the votes were votes to continue (step 208). In response to determining that there are no votes to continue, the method may end, and an empty set of results may be returned (step 210). In response to determining that there are one or more votes to continue, the method may include determining whether there are more query steps to perform in the query plan (step 212).

In response to determining that there are steps left to perform in the query plan, the method returns to step 204 to send activation messages and conditions. In response to determining that there are no steps left to perform in the query plan, the method includes retrieving and returning generated query results (step 214). Subsequently, the method may end (step 210).

Figure 3:
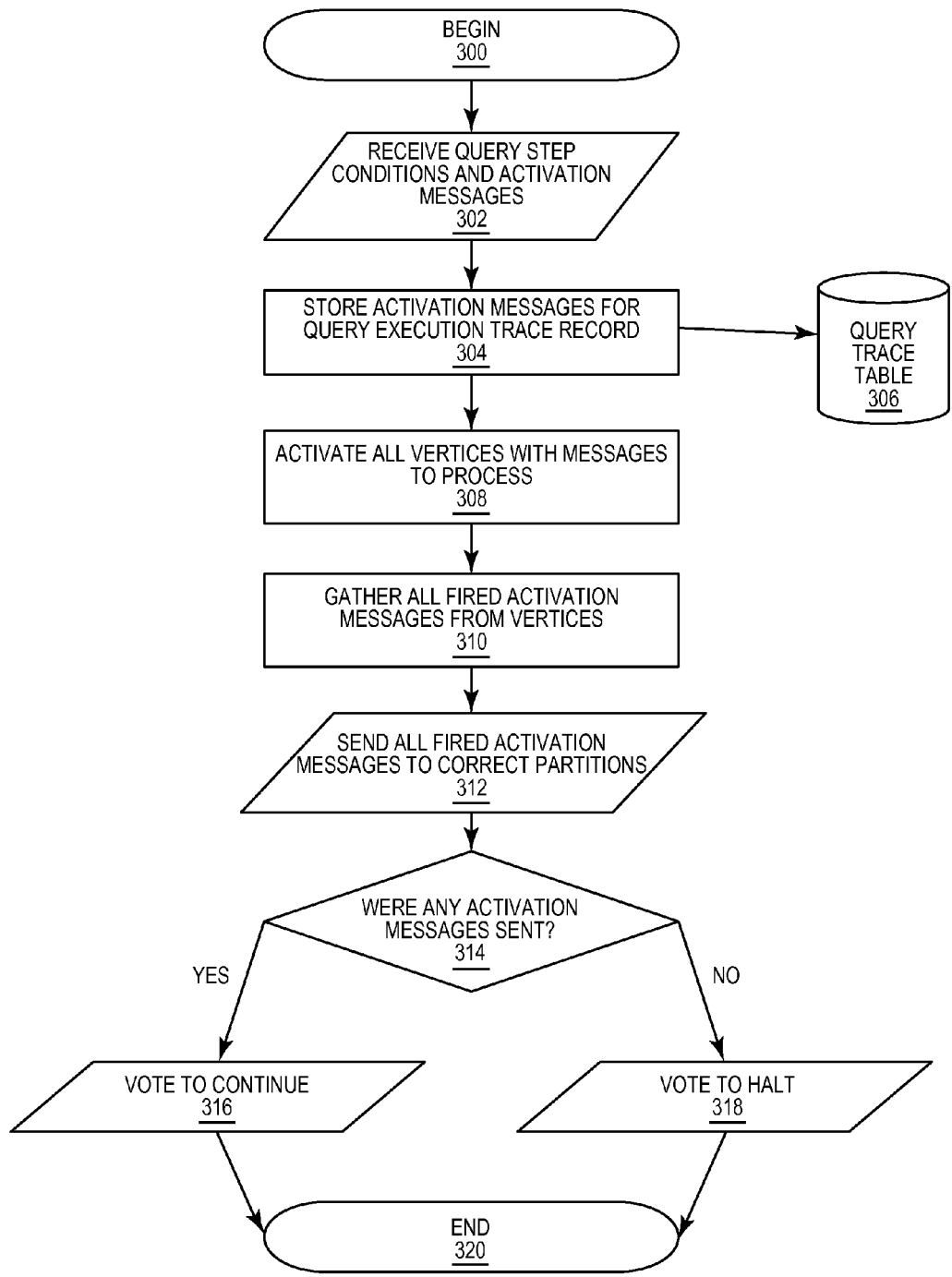
FIG. 3 is a flow chart of an example method for managing execution of a graph query step in a graph partition in accordance with embodiments of the present disclosure.

FIG. 3 is a flow chart of an example method for managing execution of a graph query step in a graph partition in accordance with embodiments of the present disclosure. The method of FIG. 3 is described as being implemented by the system 100 shown in FIG. 1; although the method may otherwise be suitably implemented. Referring to FIG. 3, the method begins at step 300.

At step 302 of FIG. 3, the method includes receiving, at graph partitions, query step conditions and activation messages from a query execution manager. For example, the graph partitions 102 may receive query step conditions and activation messages from the query execution manager 108. Some or all activation messages may be stored (step 304) in a query trace table 306 for later reference in generating results off of trace paths generated by a query execution.

The method of FIG. 3 may include activating all vertices that have received one or more activation messages (step 308). For example, vertices 106 that have received one or more activation messages may be activated. The vertices 106 may be passed the collection of activation messages they received along with the threshold conditions for the current query step.

The method of FIG. 3 may include gathering all fired activation messages from vertices (step 310). For example, all activation messages generated by vertex 106 firings may be gathered.

At step 312, the method includes sending all fired activation messages to correct partitions. For example, the gathered activation messages may be sent to the graph partitions 104 that contain the addressed graph vertexes 106.

At step 314, it is determined whether any activation messages were sent. For example, the graph partition 104 may determine whether any messages were sent. In response to determining that activation messages were sent, the method includes voting to continue (step 316). For example, the graph partition 104 may vote to continue by sending a message indicating its vote to continue to the query execution manager 108.

In response to determining that no messages were sent, the method includes voting to halt (step 318). For example, the graph partition 104 may vote to halt by sending a message indicating its vote to halt to the query execution manager 108. Subsequent to steps 316 and 318, the method may end (step 320).

Figure 4:
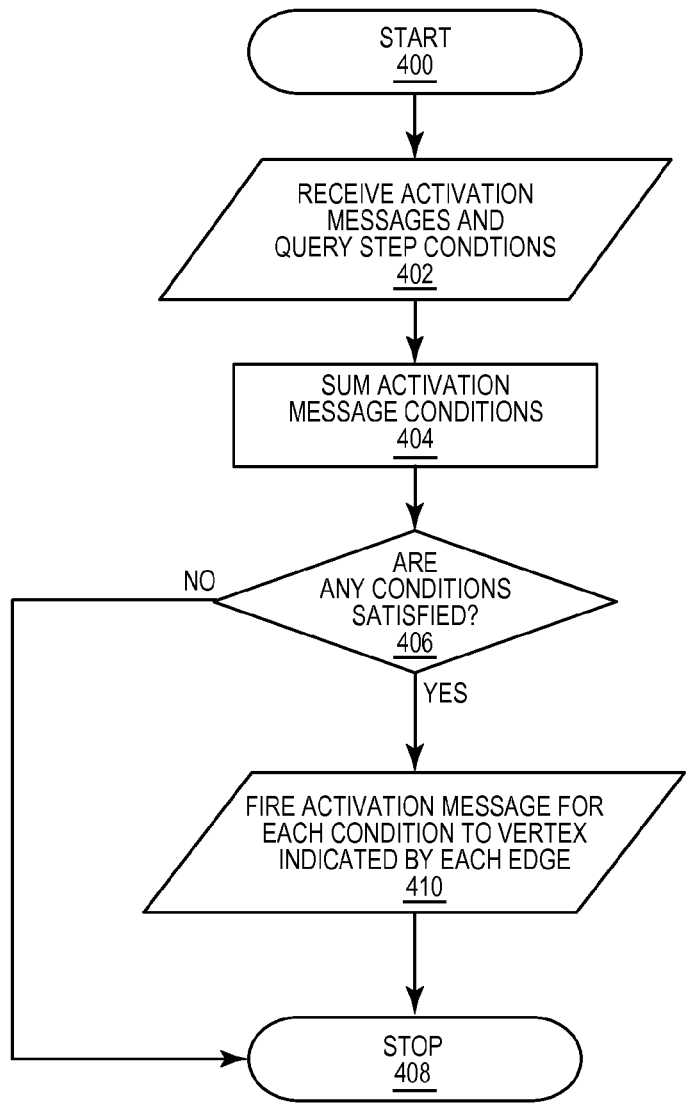
FIG. 4 is a flow chart of an example method for performing a graph query step by an individual activated graph vertex in accordance with embodiments of the present disclosure.

FIG. 4 is a flow chart of an example method for executing a query step in a graph vertex in accordance with embodiments of the present disclosure. The method of FIG. 4 is described as being implemented by the system 100 shown in FIG. 1; although the method may otherwise be suitably implemented. Referring to FIG. 4, the method begins at step 400.

At step 402, the method includes receiving activation messages and query step conditions. For example, the graph vertex 106-1 may receive activation messages and the current query step conditions from a graph partition 104.

The method of FIG. 4 includes summing activation message conditions (step 404). For example, the graph vertex 106-1 may perform a sum of the activation messages that it received. This sum could be performed using any suitable technique. In one embodiment, the activation messages take the form of bit flags indicating conditions that were satisfied in a previous query step that lead to the firing of the activation message received by the graph vertex. The sum of these bit flags can be, for example, a logical-or of their values.

The method of FIG. 4 includes determining whether any conditions are satisfied (step 406). For example, the graph vertex 106-1 may determine whether any of the query step conditions were satisfied. This determination may be made by comparing the sum of the activation messages to each of the query step conditions. This comparison may be implemented using any suitable technique. In one embodiment, the sum of the activation messages can be a logical-or of the activation message values. The comparison performed may be a logical-and of the sum of the activation messages. A query step condition may be met when the result of the logical-and is equal to the query step condition. In response to determining that no conditions were satisfied, the method ends (step 408).

In response to determining that any conditions were satisfied, the method includes firing an activation message for each condition to a vertex indicated by each edge (step 410). For example, an activation message may be fired for each condition satisfied to each graph vertex 106 indicated by each edge out from the activated graph vertex 106. In some embodiments, an activation message may only be sent to specific classes of edges indicated as a part of the query step condition. In another embodiment, only edges representing a specific labeled edge are sent activation messages to more efficiently represent and execute the query. Subsequently, the method may end (step 408).

Figure 5:
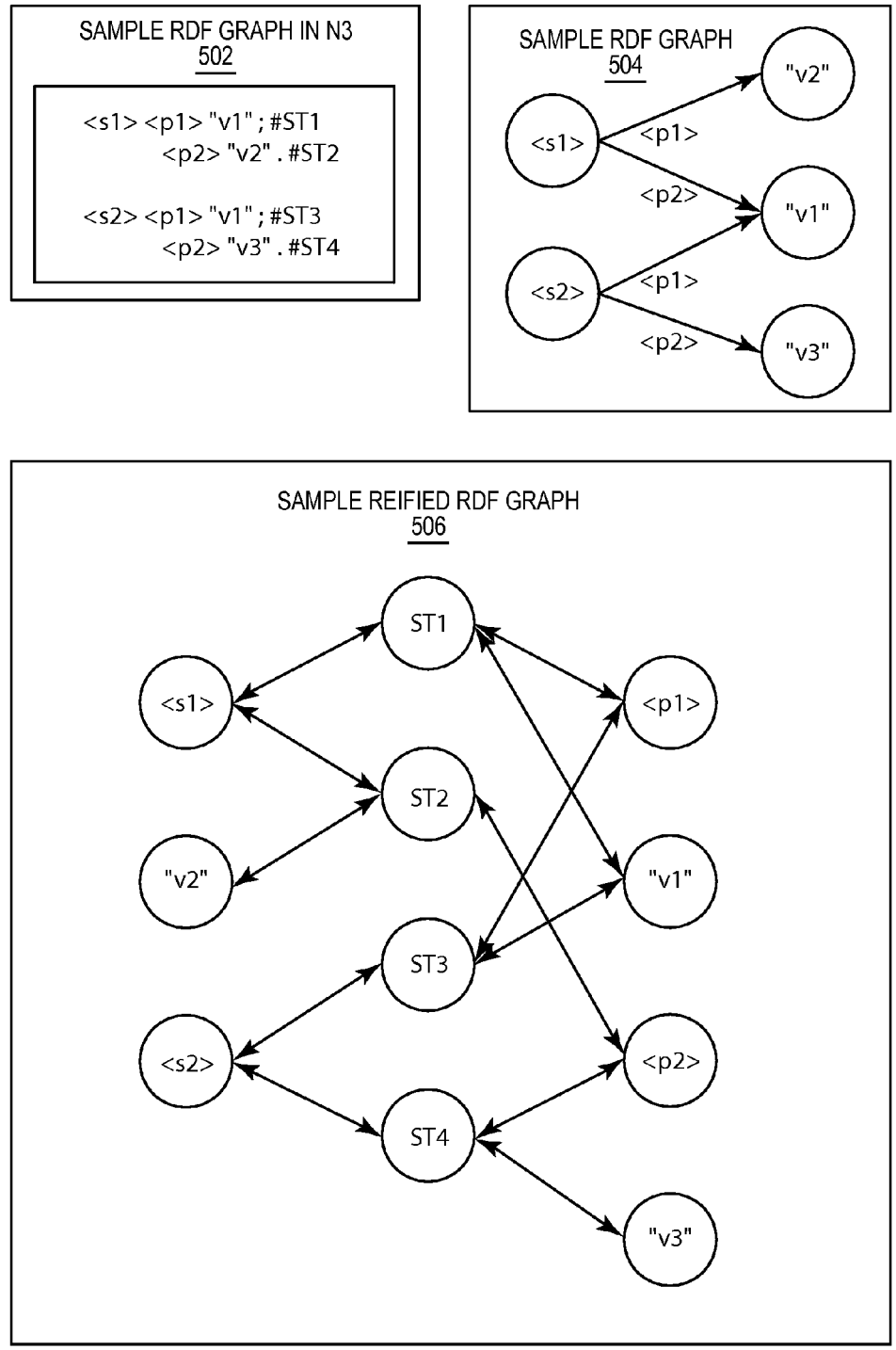
FIG. 5 depicts an example Notation 3 (N3) document specifying a resource description framework (RDF) graph, a schematic block diagram illustrating the RDF graph, and a schematic block diagram depicting an exemplary abstract representation of an RDF graph in accordance with embodiments of the present disclosure.

FIG. 5 depicts an example Notation 3 (N3) document specifying a resource description framework (RDF) graph, a schematic block diagram illustrating the RDF graph, and a schematic block diagram depicting an exemplary abstract representation of an RDF graph in accordance with embodiments of the present disclosure. Referring to FIG. 5, the sample RDF data 502 is shown in N3 format and specifies 4 RDF statements. The sample RDF graph 504 depicts the RDF statements specified by the example RDF data 502 as a directed graph mapping subject vertices to object vertices. The sample reified RDF graph 506 depicts a reified graph representation of the 4 RDF statements specified by the RDF data 502. The reification of the graph specified in RDF data 502 illustrated by graph 506 is an embodiment of how an RDF graph may be represented in a graph database in accordance with the present disclosure, although others may be used. In this illustration, there is a vertex for every unique subject, predicate, and object value present in the RDF graph, as well as a vertex for every statement. In addition to vertices, there are edges from every RDF node vertex to the statements that reference them, and edges from every statement vertex to every RDF node vertex for every RDF node the statement mentions. RDF graph data is one type of graph data that can be represented in accordance with the present disclosure, however, any graph data comprised of vertices and edges can be represented in accordance with the present disclosure.

Figure 6:
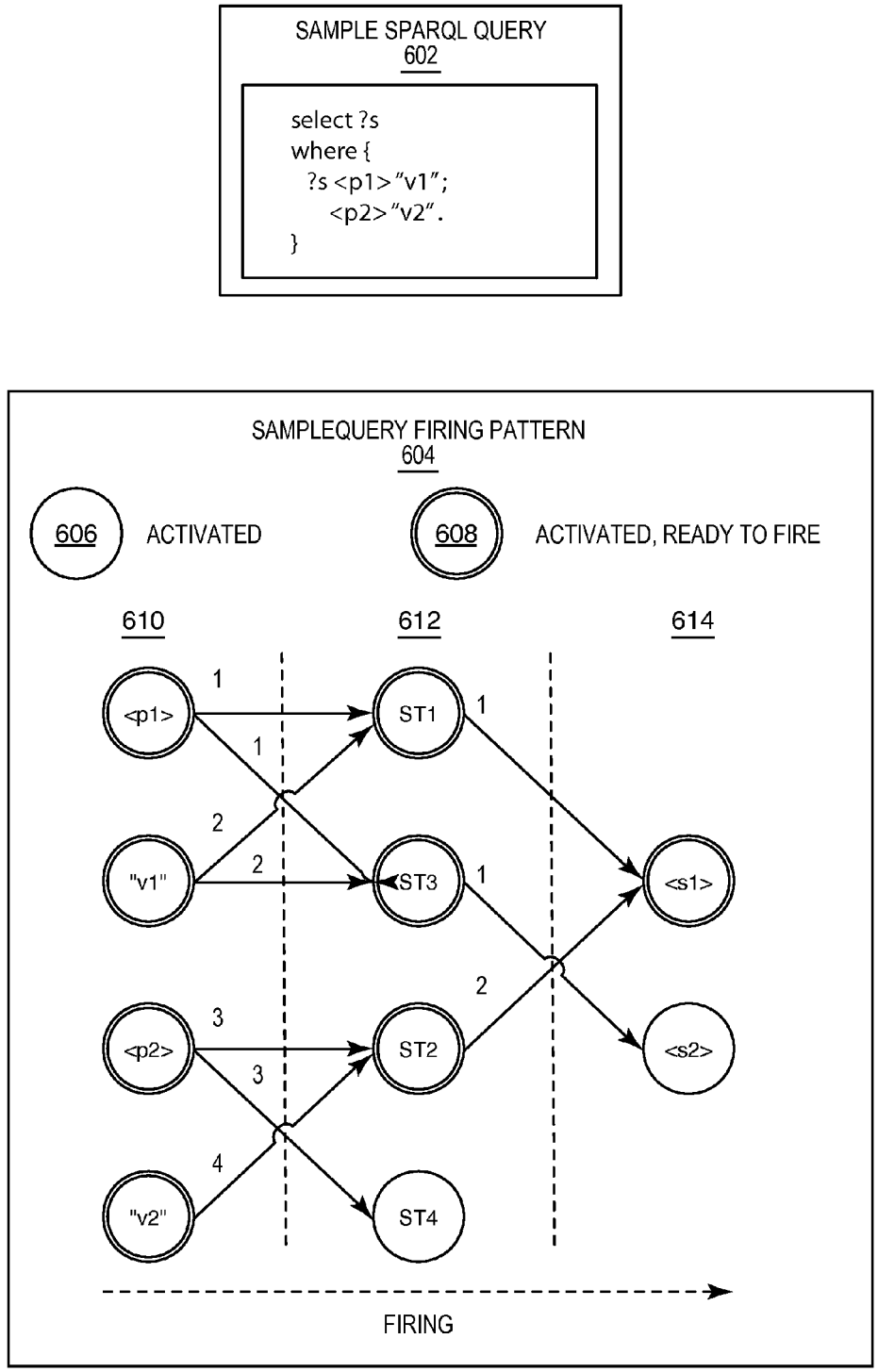
FIG. 6 depicts an example SPARQL protocol and RDF query language (SPARQL) query and a schematic block diagram depicting an exemplary abstract representation of a series of firing steps in executing a SPARQL query over an RDF graph in accordance with embodiments of the present disclosure.

FIG. 6 depicts an example SPARQL protocol and RDF query language (SPARQL) query and a schematic block diagram depicting an exemplary abstract representation of a series of firing steps in executing a SPARQL query 602 over an RDF graph in accordance with embodiments of the present disclosure. The SPARQL query 602 specifies two basic graph patterns that must be satisfied with a join condition on the subject for matching statements. SPARQL queries are an example of query semantics that can be implemented in accordance with the present disclosure. It is noted that other query semantics may also be implemented in accordance with the present disclosure.

A sample query firing pattern 604 shows an example execution of the query 602. In this diagram, activated but not ready to fire vertices are shown by a single line circle 606, while activated and ready to fire vertices are shown by a double line circle 608. In the first step 610, the literals from the basic graph patterns in the query 602 may be activated and fired with the indicated condition value passed along in the activation message. For example, the "<p1>" vertex in the first step 610 fires an activation message along its two edges with an associated condition value of "1". In the second step 612 the vertices may receive the activation messages, sum them, and determine if they should fire. The "ST1" and "ST3" vertices may both receive messages summing to 3, and may fire activation messages indicating that they satisfied the condition 1 for that query step. The "ST2" vertex may receive messages summing to 7 and fire an activation message indicating it satisfied the condition 2 for that query step. The vertex "ST4" may receive a single message with the value of 3 and may fail to satisfy any conditions in this query step and so does not fire any activation messages. In the third and final step in the execution of the query 614, the "<s1>" vertex receives activation messages summing to 3, while the "<s2>" vertex receives only a single activation message with a value of 1. The "<s1>" vertex is shown as activated and ready to fire 608 as it satisfies the final condition of the query and represents a solution to the query. The "<s2>" vertex is shown only as activated as it fails to satisfy the final condition of the query and is not a valid solution to the query.

Figure 7:
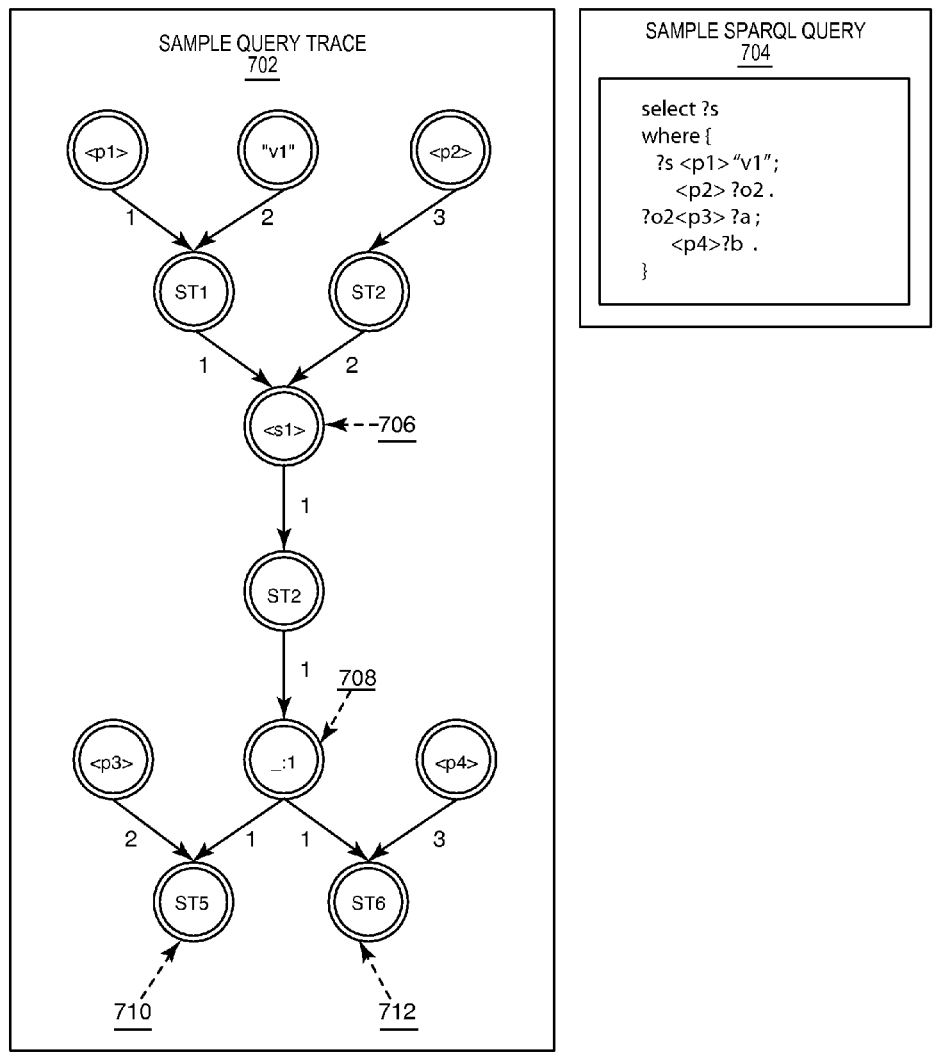
FIG. 7 is an example schematic block diagram depicting an example query trace graph generated by executing a graph query over an RDF graph and a sample SPARQL query in accordance with embodiments of the present disclosure.

FIG. 7 is an example schematic block diagram depicting an example query trace graph generated by executing a graph query 702 over an RDF graph and a sample SPARQL query in accordance with embodiments of the present disclosure. Referring to FIG. 7, the execution trace graph was generated by the execution of a query 702. The SPARQL query 704 was executed to generate this trace. The trace graph 702 represents a valid solution to the query and may be just a portion of the trace graph generated by the execution of the query. In the trace graph, some of the vertexes represent variable values mentioned in the query. The vertex "ST5" labeled as 710 at the bottom of the graph represents the value ?a in the query 704 and can be identified by its depth in the trace graph and by the sum of the conditions that activated it, 3. The vertex "ST6," labeled as 712, represents the value ?b in the query 704 and can be identified by its depth in the trace graph and by the sum of the conditions that activated it, 4. The vertex "\_:1," labeled as 708, represents the value ?o2 in the query 704 and can be identified by its depth in the trace graph and by the sum of the conditions that activated it, 1. Finally, the vertex <s1>, labeled as 706, represents the value ?s in the query 704 and can be identified by its depth in the trace graph and the sum of the conditions that activated it, 3.

Figure 8:
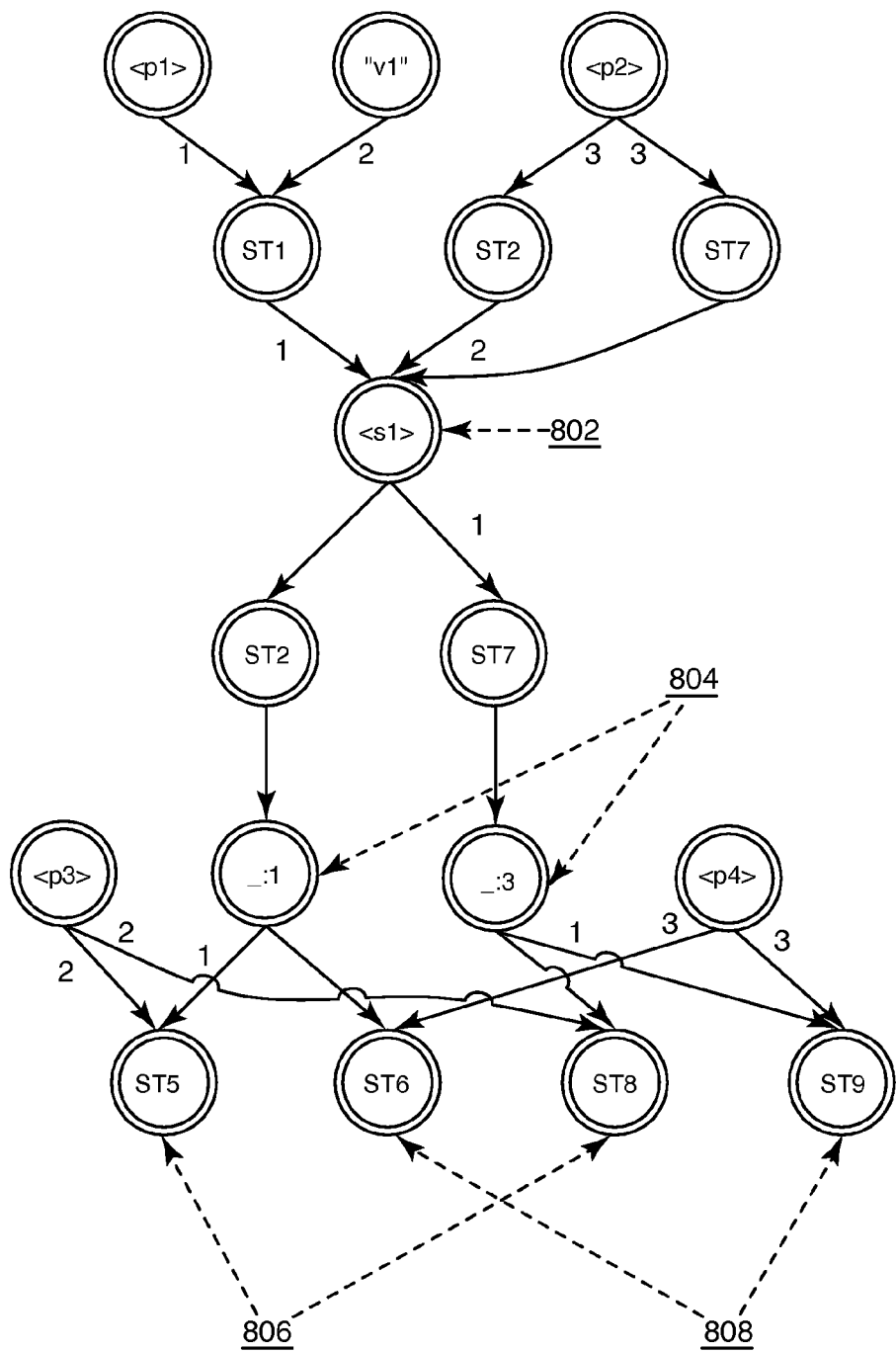
FIG. 8 is a sample schematic block diagram depicting an exemplary query trace graph generated by executing a graph query over an RDF graph where there is overlap in trace paths representing solutions to the query in accordance with embodiments of the present disclosure.

FIG. 8 is a schematic block diagram illustrating a more complicated trace graph that may be generated by the query 704 shown in FIG. 7. In this illustration, there are two overlapping trace paths shown. The trace paths overlap on the vertex "<s1>," labeled 802, and representing the ?s variable from the query 704. There are two vertices representing the value ?o2 comprised of the vertex "\_:1" and "\_:2" with the pair labeled as 804. The pair of vertices labeled as 806 represent the value ?a from the query 704 and the pair of vertices labeled as 808 represent the value ?b from the query 704. In this overlapping pair of trace paths, the vertices <s1>, ST5, and ST8 represent one solution to the query, while the vertices <s1>, ST6, and ST9 represent another solution to the query.

Figure 9:
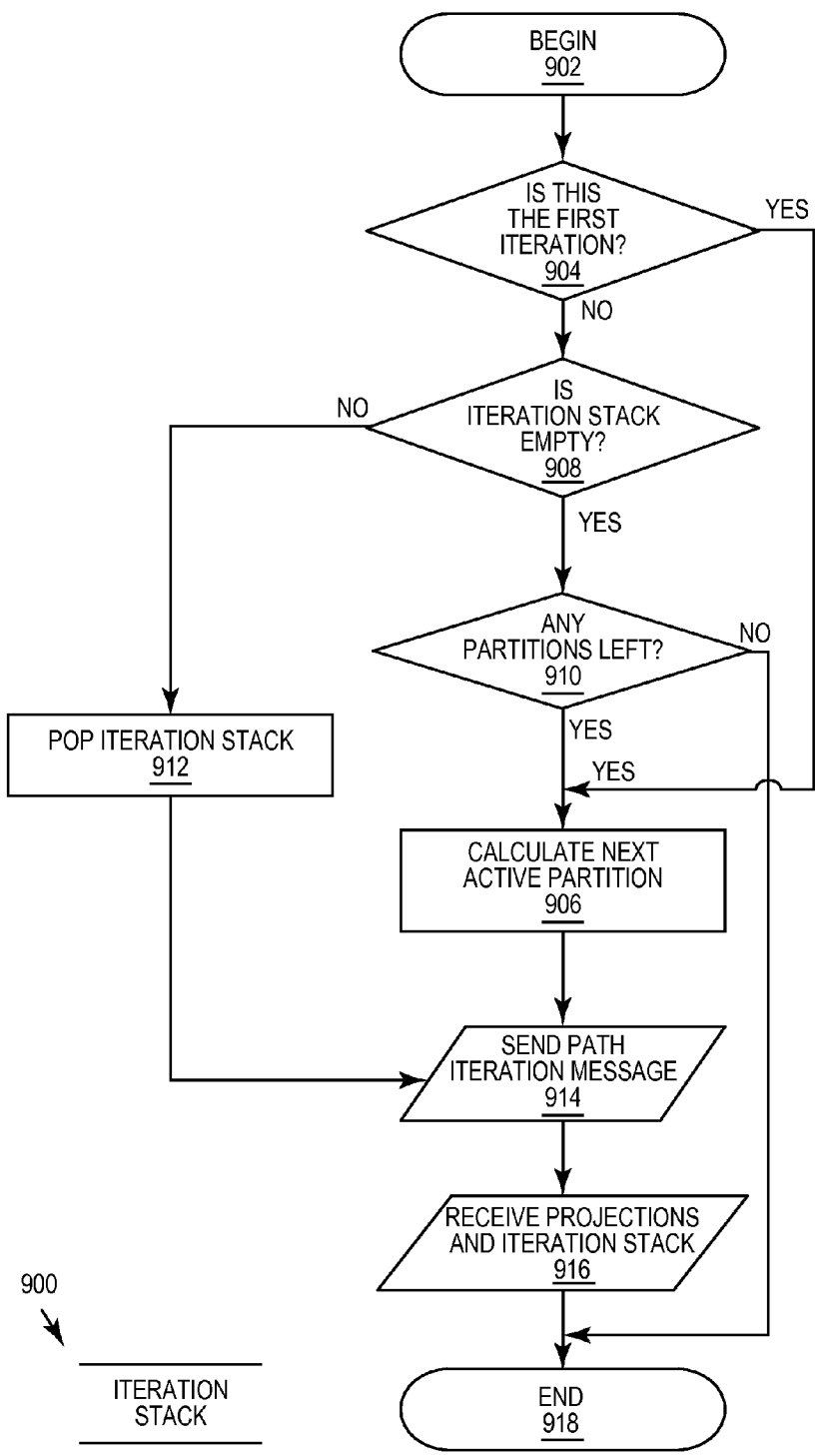
FIG. 9 is a flow chart diagram depicting an example method for managing the iteration over and retrieval of query solution paths contained in a query execution trace by a query execution manager in accordance with embodiments of the present disclosure.

FIG. 9 is a flow chart diagram depicting an example method for managing the iteration over and retrieval of query solution paths contained in a query execution trace by a query execution manager in accordance with embodiments of the present disclosure. The method of FIG. 9 is described as being implemented by the system 100 shown in FIG. 1; although the method may otherwise be suitably implemented. In this example, a data structure representing the current state of the iteration 900 is maintained. There are many possible implementations of this data structure 900. One example implementation of this data structure 900 is a stack of data structures with pointers to vertices and edge indices.

Referring to FIG. 9, the method begins at step 902. At step 904, it is determined whether this is the first iteration over query paths. In response to determining that this is the first iteration, the method includes selecting a next partition to iterate over as the active partition (step 906). In response to determining that this is not the first iteration, the method includes determining whether the iteration stack is empty (step 908). For example, it may be determined if the current iteration stack is empty. In response to determining that the iteration stack is empty, the method includes determining whether there are any partitions left to iterate over (step 910). In response to determining that the iteration stack is not empty, the next iteration to perform is popped off of the iteration stack (step 912).

Subsequent to the next iteration to perform being popped off of the stack at step 912, an iteration message is sent to the active graph partition (step 914).

In response to determining that there are no partitions left to iterate over at step 910, the method ends at step 918. In response to determining that there are partitions left to iterate over the next active partition is calculated (step 906). Subsequently, an iteration message is sent to the active graph partition (step 914).

Subsequent to an iteration message being sent to the active partition, the result projections from the path and the iteration stack 900 are received (step 916). The iteration stack 900 may have been altered by the execution of the path traversal and may indicate the starting point of the next branching path to follow or will be empty. Subsequent to step 916, the method ends at step 918.

Figure 10:
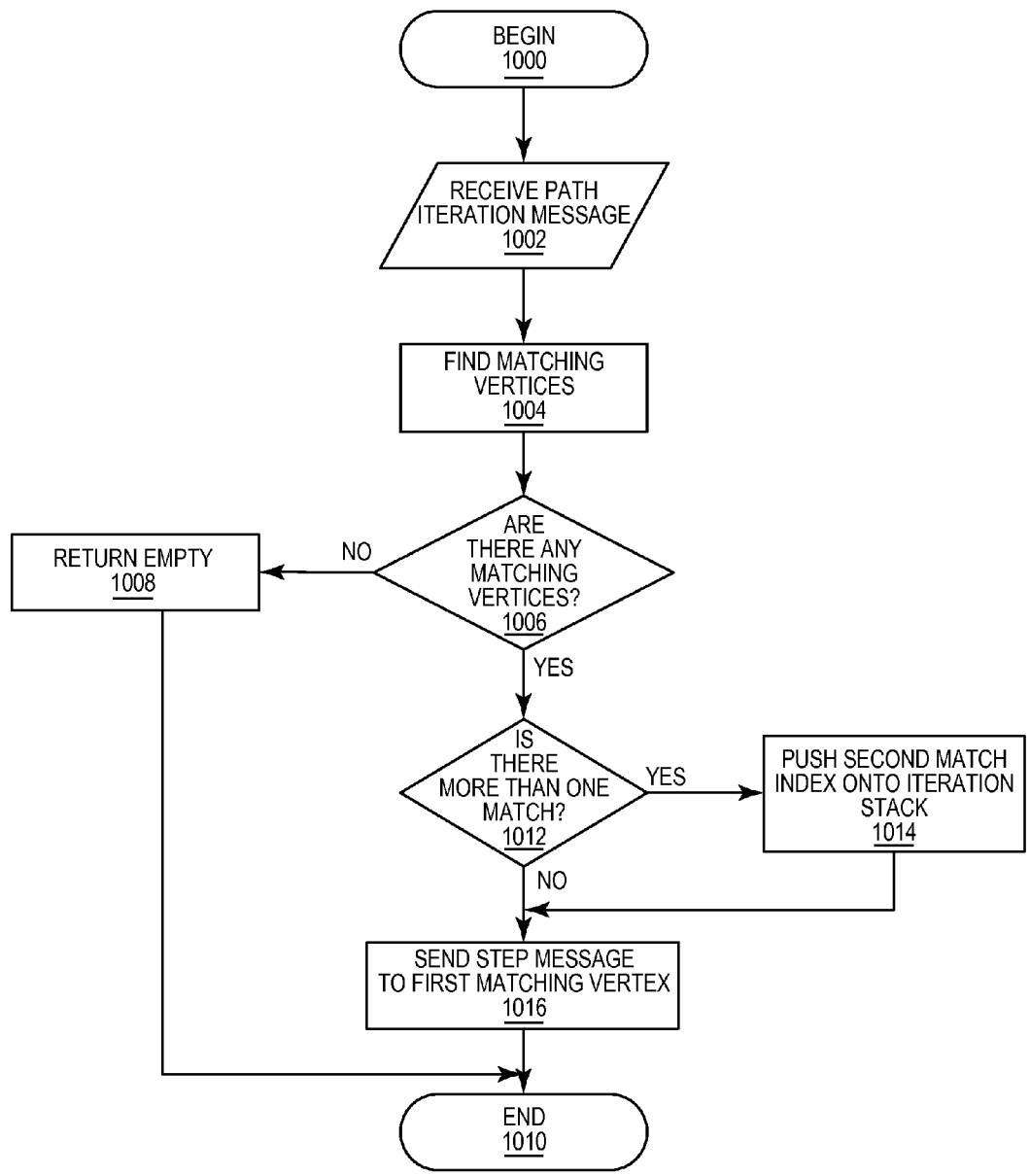
FIG. 10 is a flow chart diagram depicting an example method for performing the initial step in iterating over and traversing the query solution paths contained in a query execution trace by a graph partition in accordance with embodiments of the present disclosure.

FIG. 10 is a flow chart of an example method for performing the initial step in iterating over and traversing the query solution paths contained in a query execution trace by a graph partition in accordance with embodiments of the present disclosure. The method of FIG. 10 is described as being implemented by the system 100 shown in FIG. 1; although the method may otherwise be suitably implemented. Referring to FIG. 10, the method begins at step 1000.

The method of FIG. 10 includes receiving a path iteration message indicating that this is an initial path traversal (step 1002). Subsequently, vertices that match the path desired are located (step 1004). The path desired is indicated by the iteration message and is the value of a condition that would have been satisfied such that a matching vertex had been activated. Once the matching vertices, if any, have been located it is determined if there are any matching vertices (step 1006). In response to determining that there are no matching vertices, a result of Empty is returned (step 1008), and the method ends (step 1010).

In response to determining that there are matching vertices at step 1006, it is determined whether there is more than one match (step 1012). In response to determining that there is more than one match, a pointer to the next index is pushed onto the iteration stack (step 1014). Subsequent to the pointer to the next index being pushed onto the iteration stack, a step message is sent to the first matching vertex (step 1016). In response to determining that there was only one match, a step message is sent to that single match (step 1016). Subsequently, the method ends (step 1010).

Figure 11:
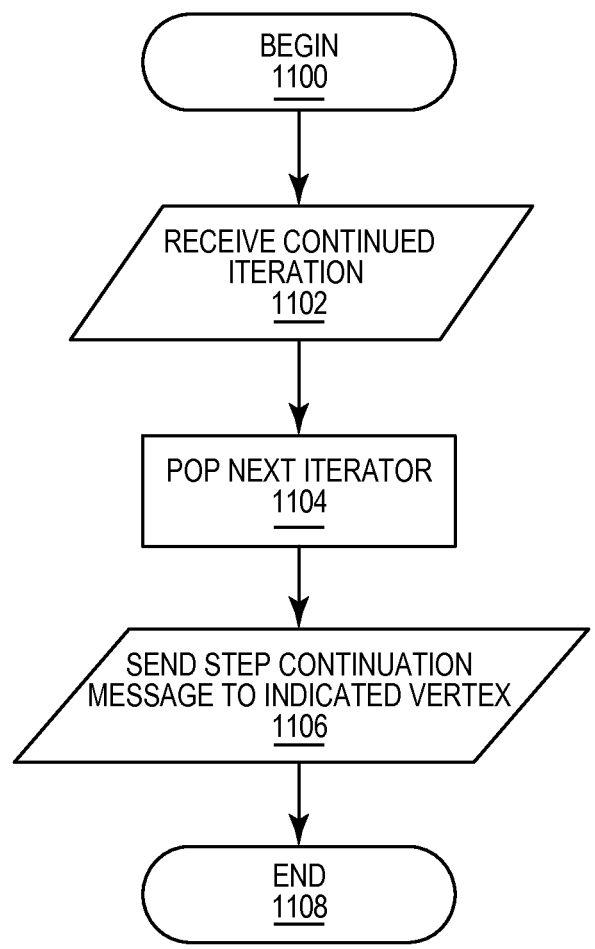
FIG. 11 is a flow chart depicting an example method for performing the successive steps in iterating over and traversing the query solution paths contained in a query execution trace by a graph partition in accordance with embodiments of the present disclosure.

FIG. 11 is a flow chart depicting an example method for performing the successive steps in iterating over and traversing the query solution paths contained in a query execution trace by a graph partition in accordance with embodiments of the present disclosure. The method of FIG. 11 is described as being implemented by the system 100 shown in FIG. 1; although the method may otherwise be suitably implemented. Referring to FIG. 11, the method begins at step 1100.

The method of FIG. 11 includes receiving the continuation of the traversal at the graph partition (step 1102). Subsequently, the next iterator is popped off of the stack (step 1104). The vertex indicated by the iterator is notified of the continued iteration step and is passed the current iteration stack and result list (step 1106). Subsequently, the method ends (step 1108).

Figure 12:
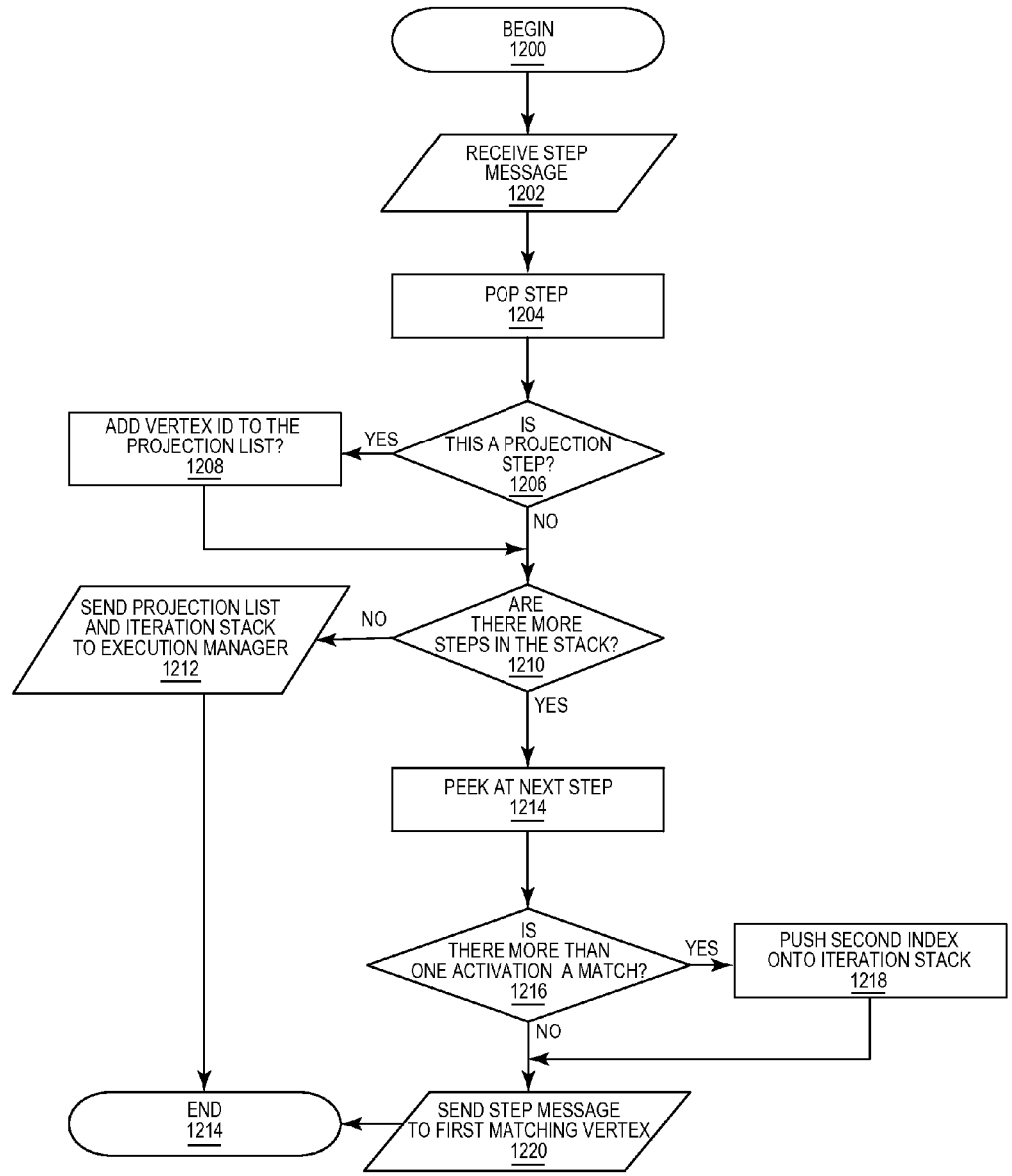
FIG. 12 is a flow chart depicting an example method for performing the initial step in iterating over and traversing the query solution paths contained in a query execution trace by a graph vertex in accordance with embodiments of the present disclosure.

FIG. 12 is a flow chart depicting an example method for performing the initial step in iterating over and traversing the query solution paths contained in a query execution trace by a graph vertex in accordance with embodiments of the present disclosure. The method of FIG. 12 is described as being implemented by the system 100 shown in FIG. 1; although the method may otherwise be suitably implemented. Referring to FIG. 12, the method begins at step 1200.

The method of FIG. 12 includes receiving a step message at the graph vertex (step 1202). In this example, it is assumed that the path to be traversed is represented as a stack to be popped as the path is traversed. Subsequently, the next path step is popped from the path stack (step 1204).

At step 1206, the method includes determining whether the step is a projection step. In response to determining that the step is a projection step, the vertex id of the current graph vertex is added to the projection list (step 1208). Subsequently, the method includes determining whether there are more steps in the stack (step 1210). In response to determining that the step was not a project step at step 1206, the method proceeds to step 1210.

In response to determining that there are no more steps in the path stack at step 1210, the project list and the iteration stack are returned to the query execution manager (step 1212) and the method ends (step 1214). In response to determining that there are more steps left in the path stack at step 1210, the next step in the stack is peeked at without popping it off of the stack (step 1214). At step 1216, the method includes determining whether there is more than one activation of the vertex that is a match for the next step in the path stack.

In response to determining that there is more than one activation of the current graph vertex matching at step 1216, the next step in the path stack the second of the matching activations is pushed onto the iteration stack (step 1218). Subsequently, an initial step message is sent to the first matching vertex (step 1220). In response to determining that there is only one match at step 1216, an initial step message is sent to the matching vertex (step 1220). Subsequently, the method ends at step 1214.

Figure 13:
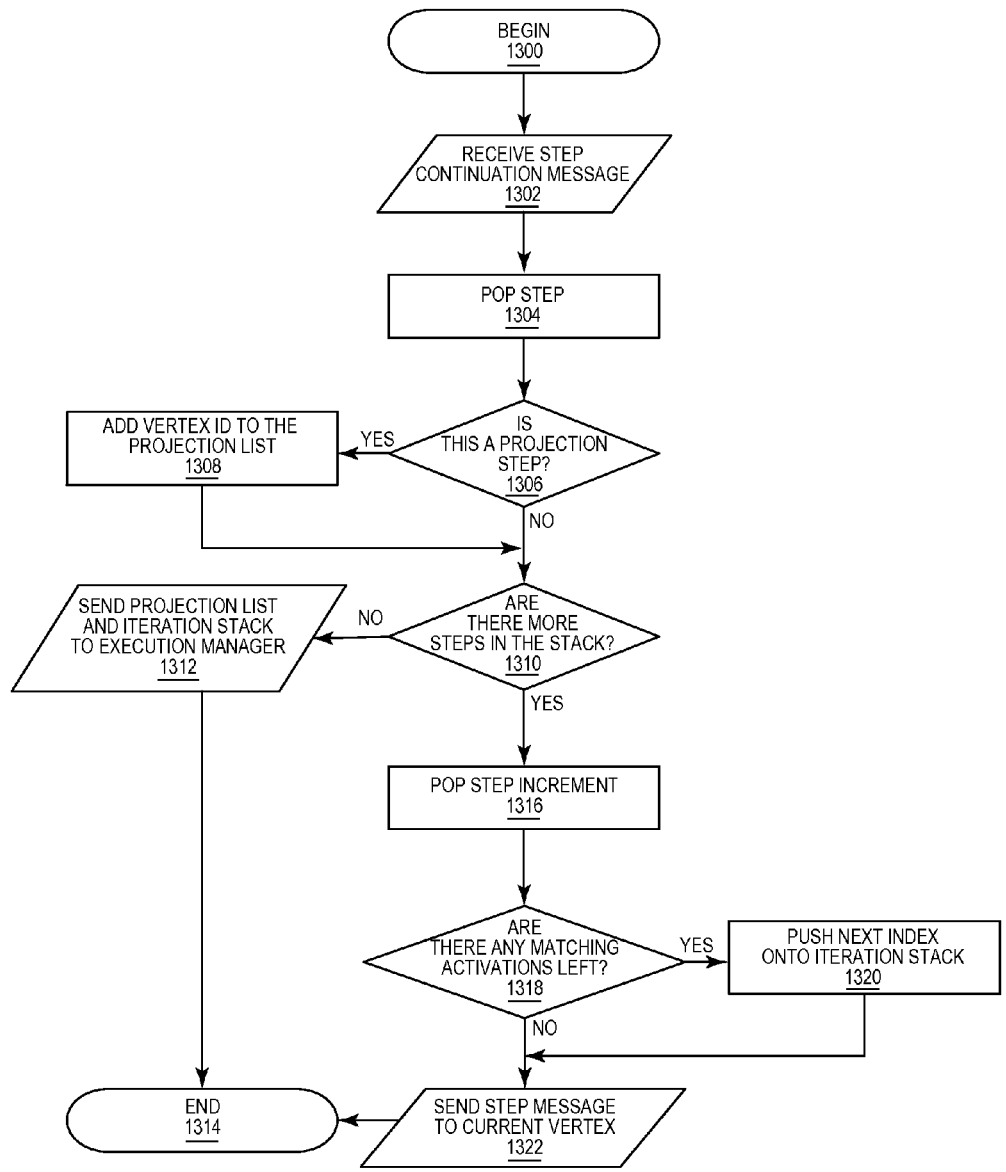
FIG. 13 is a flow chart diagram of an example method for performing the successive steps in iterating over and traversing the query solution paths contained in a query execution trace by a graph vertex in accordance with embodiments of the present disclosure.

FIG. 13 is a flow chart of an example method for performing the successive steps in iterating over and traversing the query solution paths contained in a query execution trace by a graph vertex in accordance with embodiments of the present disclosure. The method of FIG. 13 is described as being implemented by the system 100 shown in FIG. 1; although the method may otherwise be suitably implemented. Referring to FIG. 13, the method begins at step 1300.

The method of FIG. 13 includes receiving a step continuation message (step 1302). Subsequently, the next step is popped off of the path stack (step 1304).

The method of FIG. 13 includes determining whether the current step is a projection step (step 1306). In response to determining that the current step is a projection step, the vertex id of the current graph vertex is added to the projection list (step 1308). Subsequently, a determination is made whether there are more steps in the stack (step 1310). In response to determining that the current step was not a projection step, the method proceeds to step 1310.

In response to determining that there are no more steps in the path stack at step 1310, the projection list and the iteration stack are returned to the query execution manager (step 1312) and the method ends (step 1314). In response to determining that there are steps left in the path stack, the iterator index is popped off of the iterator stack (step 1316). Subsequently, the method includes determining whether there are any more activations left to be traversed beyond the activation indicated by the popped off index (step 1318).

In response to determining that there are one or more activations left, the next index is pushed onto the iteration stack (step 1320). Subsequently, at step 1322, a step message is sent to the graph vertex indicated by the activation index popped off in step 1316. In response to determining that there were no matching activations left beyond the current one, then the step message is sent to the graph vertex indicated by the activation (step 1322). Subsequently, the method ends (step 1314).

Figure 14:
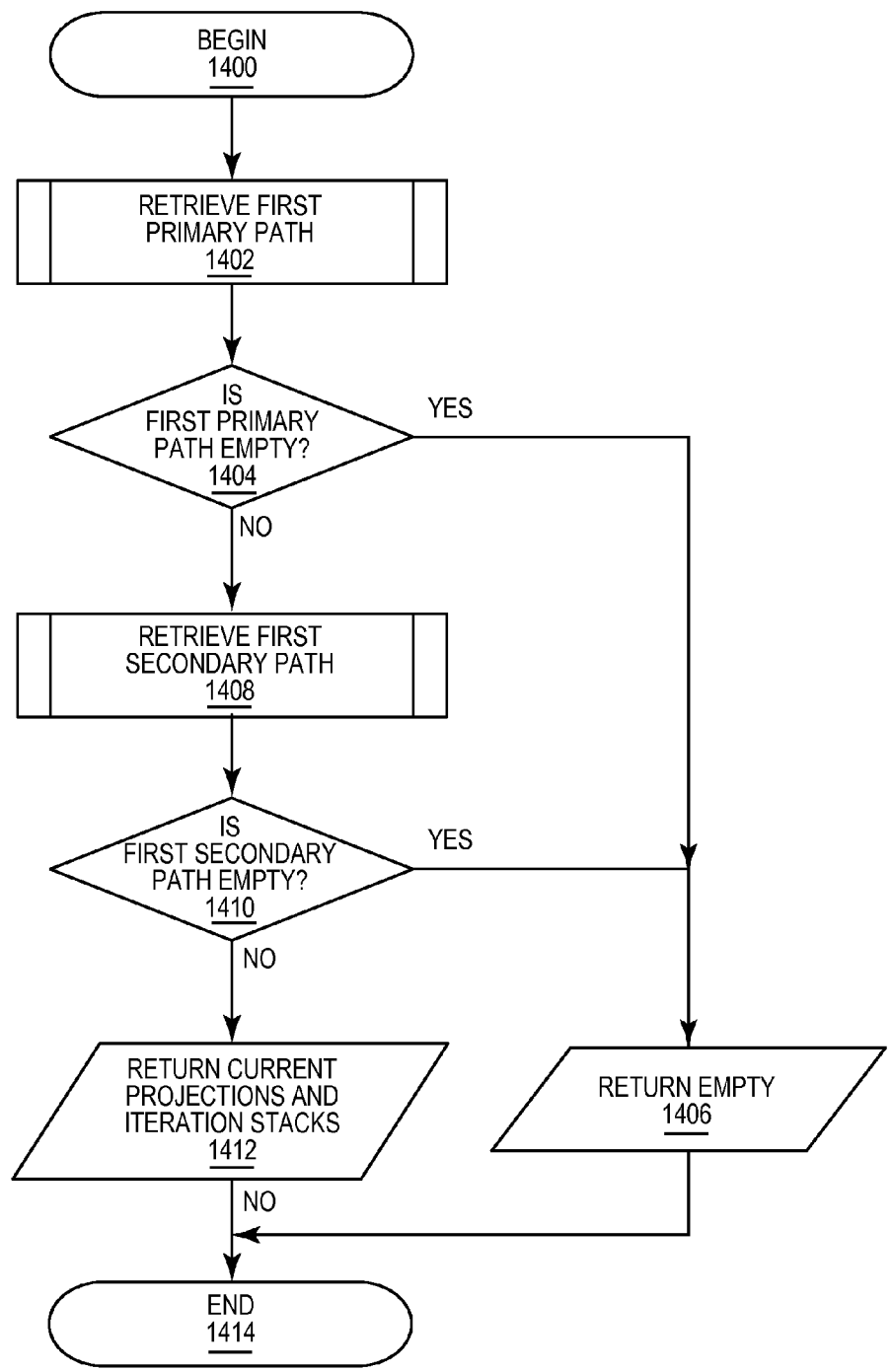
FIG. 14 is a flow chart of an example method for managing the initial step in the determination of the Cartesian product of a pair of query solution paths contained in a query execution trace by a query execution manager in accordance with embodiments of the present disclosure.

Many types of queries require the generation of the Cartesian product of query results. As an example, FIG. 14 is a flow chart of a method for managing the initial step in the determination of the Cartesian product of a pair of query solution paths contained in a query execution trace by a query execution manager in accordance with embodiments of the present disclosure. The method of FIG. 14 is described as being implemented by the system 100 shown in FIG. 1; although the method may otherwise be suitably implemented. Referring to FIG. 14, the method begins at step 1400.

The method of FIG. 14 includes retrieving an iterator stack for the first, or primary, path. This process can be implemented in accordance with the methods described with respect to FIGS. 9-13. A determination is made whether the primary path is empty (step 1404). In response to determining that the primary path is empty, an empty result is returned (step 1406). In response to determining that the primary path is not empty, the secondary path iterator is retrieved (step 1408). As with the retrieval of the primary path iterator, the retrieval of the secondary path iterator can be performed in accordance with the example methods described with respect to FIGS. 9-13.

The method of FIG. 14 includes determining whether the secondary path is empty (step 1410). In response to determining that the secondary path is empty, an empty result is returned (step 1406). In response to determining that the secondary path is not empty, the current projections and iteration stacks are returned (step 1412). Subsequently, the method ends (step 1414).

Figure 15:
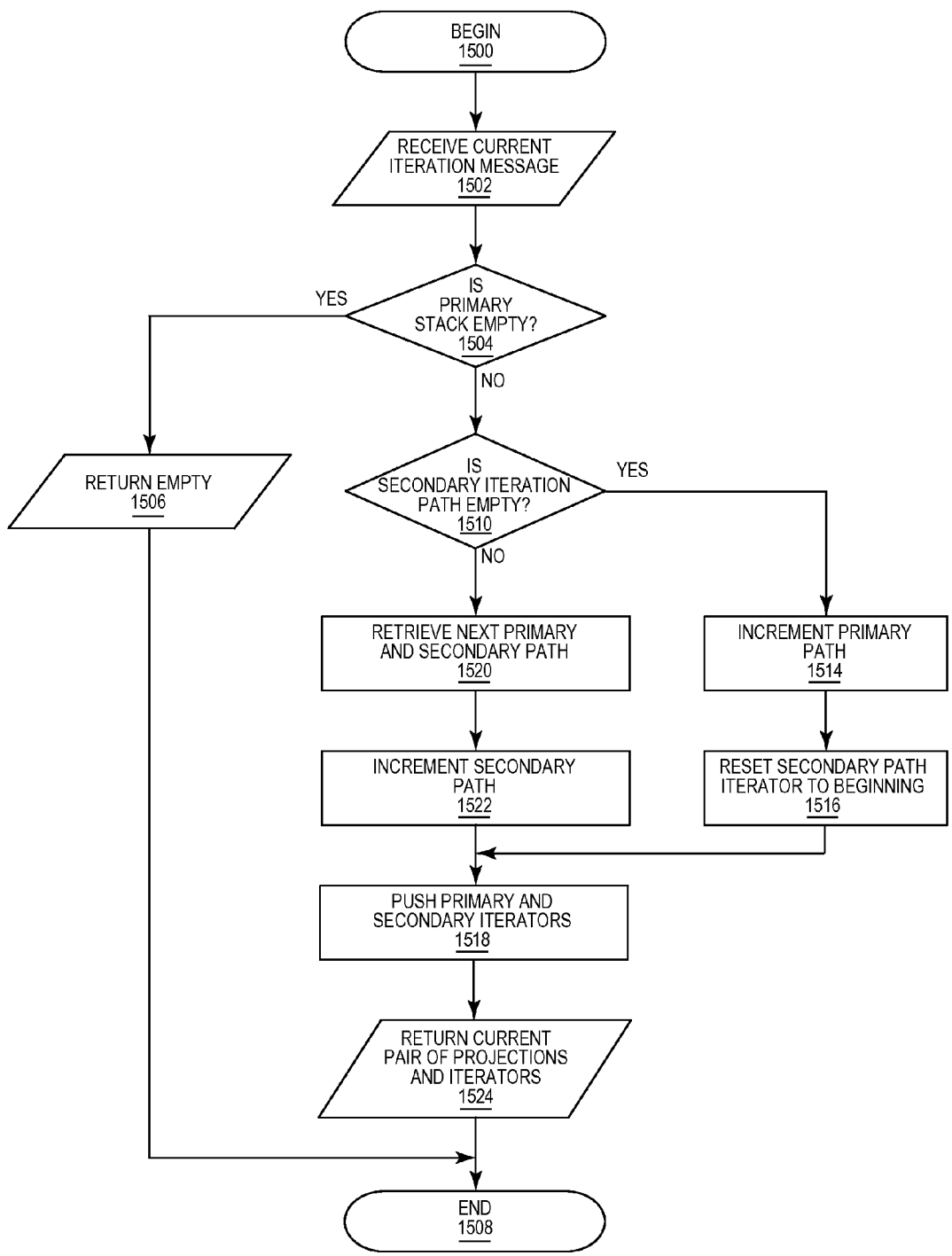
FIG. 15 is a flow chart diagram of an example method for managing the successive steps in the determination of the Cartesian product of a pair of query solution paths contained in a query execution trace by a query execution manager in accordance with embodiments of the present disclosure.

FIG. 15 is a flow chart of an example method for managing the successive steps in the determination of the Cartesian product of a pair of query solution paths contained in a query execution trace by a query execution manager in accordance with embodiments of the present disclosure. The method of FIG. 15 is described as being implemented by the system 100 shown in FIG. 1; although the method may otherwise be suitably implemented. Referring to FIG. 15, the method begins at step 1500.

The method of FIG. 15 includes receiving a message for the current iteration (step 1502). The method also includes determining whether the primary iteration stack is empty (step 1504). In response to determining that the primary iteration stack is empty, an empty result is returned (step 1506) and the method ends (step 1508). In response to determining that the primary iteration stack is not empty, a determination is made whether the secondary iteration stack is empty (step 1510).

In response to determining that the secondary iteration stack is empty, the primary path step is incremented (step 1514). Subsequently, the secondary path iterator is reset to the first index (step 1516) to be iterated over again. In this manner, the product of the secondary iterator with the next index in the primary iterator can be generated by successive applications of the method. Subsequently, the primary and secondary iterators are pushed back onto the iteration stack (step 1518).

In response to determining that the secondary iteration stack is not empty, the next primary and secondary paths are retrieved (step 1520). Subsequently, the secondary path is incremented (step 1522). The primary and secondary path iterators are pushed back onto the iterator stack (step 1518). Subsequently, the current pair of projections and pair of iterators are returned (step 1524), and the method ends (step 1508).

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
    providing a graph comprising vertices and edges associated with the vertices;
    sending one or more first activation messages to a first set of the vertices, wherein each of the first activation messages has a value;
    at each vertex of the first set of vertices:
        determining whether the values of the one or more first activation messages received at the vertex meets a query condition;
        in response to determining that the values of the one or more first activation messages received at the vertex meets the query condition, sending one or more second activation messages from the vertex to a second set of vertices;
        receiving votes from graph partitions associated with the vertices, wherein the votes indicate whether to continue;
        determining whether to continue based on the votes;
        in response to determining to continue, performing a query plan; and
        in response to determining not to continue, halting performance of the query plan.

2. The method of claim 1, wherein the graph is one of a directed graph and a digraph.

3. The method of claim 1, wherein providing the graph comprises storing data of the graph in memory.

4. The method of claim 1, wherein the steps of determining and sending one or more second activation messages are implemented in separate processing units.

5. The method of claim 4, further comprising assigning each vertex of the first set of vertices to one of the processing units.

6. The method of claim 4, further comprising assigning each vertex of the second set of vertices to one of the processing units.

7. The method of claim 1, wherein the steps of determining and sending one or more section activation messages are implemented in separate computing threads.

8. The method of claim 1, wherein sending one or more first activation messages comprises sending the one or more first activation messages to processing units associated with the first set of vertices.

9. The method of claim 1, wherein sending one or more second activation messages comprises sending the one of more second activation messages to processing units associated with the second set of vertices.

10. The method of claim 9, further comprising repeating the step of sending one or more second activation messages.

11. The method of claim 1, further comprising generating query results based on the first and second activation messages.

12. The method of claim 9, further comprising repeating the step of generating query results.

13. The method of claim 1, further comprising repeating the steps of determining and sending one or more second activation messages in accordance with a query step.

14. The method of claim 1, further comprising generating query pattern results based on activations of the first and second set of vertices.

15. The method of claim f further comprising recording the vertex firings and resultant vertex activations in performance of sub-graph pattern matching plans directly over a reified graph representation of any graph or digraph and iterating over that record of firings and activations to generate matches to sub-graph pattern.

16. A computing device comprising:
    at least one processor and memory configured to:
    provide a graph comprising vertices and edges associated with the vertices;
    send one or more first activation messages to a first set of the vertices, wherein each of the first activation messages has a value;
    at each vertex of the first set of vertices:
        determine whether the values of the one or more first activation messages received at the vertex meets a query condition;
        send one or more second activation messages from the vertex to a second set of vertices in response to determining that the values of the one or more first activation messages received at the vertex meets the query condition;
        receive votes from graph partitions associated with the vertices, wherein the votes indicate whether to continue;
        determine whether to continue based on the votes;

perform a query plan in response to determining to continue; and halt performance of the query plan in response to determining not to continue.

17. The computing device of claim 16, wherein the graph is one of a directed graph and a digraph.

18. The computing device of claim 16, wherein the at least one processor and memory are configured to store data of the graph in memory.

19. The computing device of claim 16, wherein determining and sending one or more second activation messages are implemented in separate processing units.

20. The computing device of claim 19, wherein the at least one processor and memory are configured to assign each vertex of the first set of vertices to one of the processing units.

21. The computing device of claim 19, wherein the at least one processor and memory are configured to assign each vertex of the second set of vertices to one of the processing units.

22. The computing device of claim 16, wherein determining and sending one or more section activation messages are implemented in separate computing threads.

23. The computing device of claim 16, wherein the at least one processor and memory are configured to send the one or more first activation messages to processing units associated with the first set of vertices.

24. The computing device of claim 16, wherein the at least one processor and memory are configured to send the one of more second activation messages to processing units associated with the second set of vertices.

25. The computing device of claim 24, wherein the at least one processor and memory are configured to repeat the function of sending one or more second activation messages.

26. The computing device of claim 16, wherein the at least one processor and memory are configured to generate query results based on the first and second activation messages.

27. The computing device of claim 26, wherein the at least one processor and memory are configured to repeat the function of generating query results.

28. The computing device of claim 16, wherein the at least one processor and memory are configured to repeat the functions of determining and sending one or more second activation messages in accordance with a query step.

29. The computing device of claim 16, wherein the at least one processor and memory are configured to generate query pattern results based on activations of the first and second set of vertices.

30. A method comprising:
providing a graph comprising vertices and edges associated with the vertices;
executing sub-graph pattern matching through vertex firing of messages to connected vertices;
in response to receipt of a message at one or more vertices, activating the one or more vertices;
applying threshold tests to aggregated messages received per activated vertex, wherein the sub-graph pattern matching steps are executed directly over a reified graph representation for any graph or digraph; and
composing sub-graph pattern matching plans to represent larger sub-graph patterns, wherein for every vertex and every threshold test satisfied by the activations of that vertex in the current round triggers a vertex firing message to connected vertices for that vertex, and a successive round of vertex activations and threshold tests.

* * * * *

UNITED STATES PATENT AND TRADEMARK OFFICE
CERTIFICATE OF CORRECTION

| | | |
|---|---|---|
| PATENT NO. | : 8,533,182 B1 | Page 1 of 1 |
| APPLICATION NO. | : 13/485904 | |
| DATED | : September 10, 2013 | |
| INVENTOR(S) | : David P. Charboneau | |

It is certified that error appears in the above-identified patent and that said Letters Patent is hereby corrected as shown below:

On the Title Page, column 2, line 24, the spelling of the Attorney firm should be corrected as follows:

(74) Attorney, Agent, or Firm - Olive Law Group, PLLC

Signed and Sealed this
Twenty-ninth Day of October, 2013

Teresa Stanek Rea
*Deputy Director of the United States Patent and Trademark Office*